Jan. 27, 1953     E. F. MacNICHOL, JR., ET AL     2,626,986
SYSTEM FOR DETERMINATION OF VELOCITY
Filed Sept. 14, 1945     2 SHEETS—SHEET 2
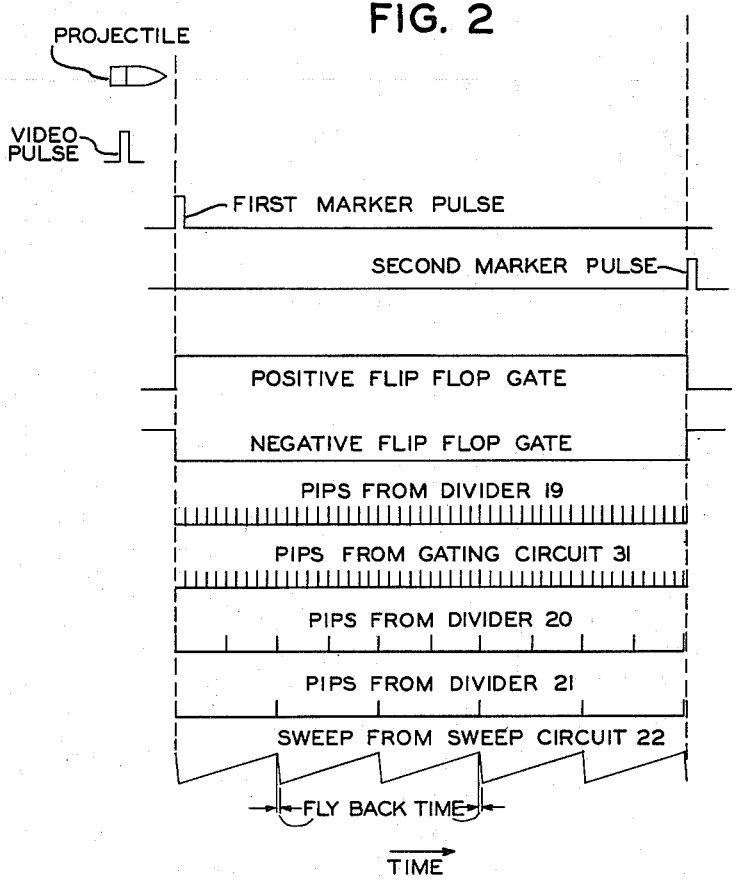
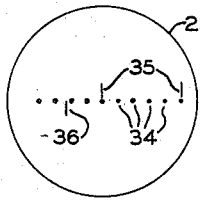 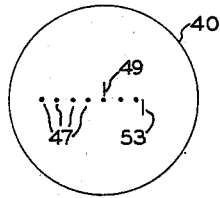 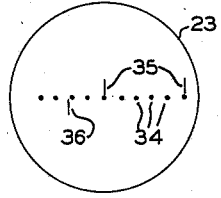 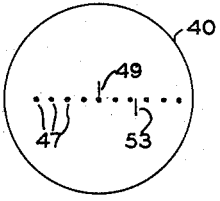
INVENTORS
EDWARD F. MacNICHOL, JR.
ISRAEL H. SUDMAN
BY *Ralph Chappell*
ATTORNEY Patented Jan. 27, 1953

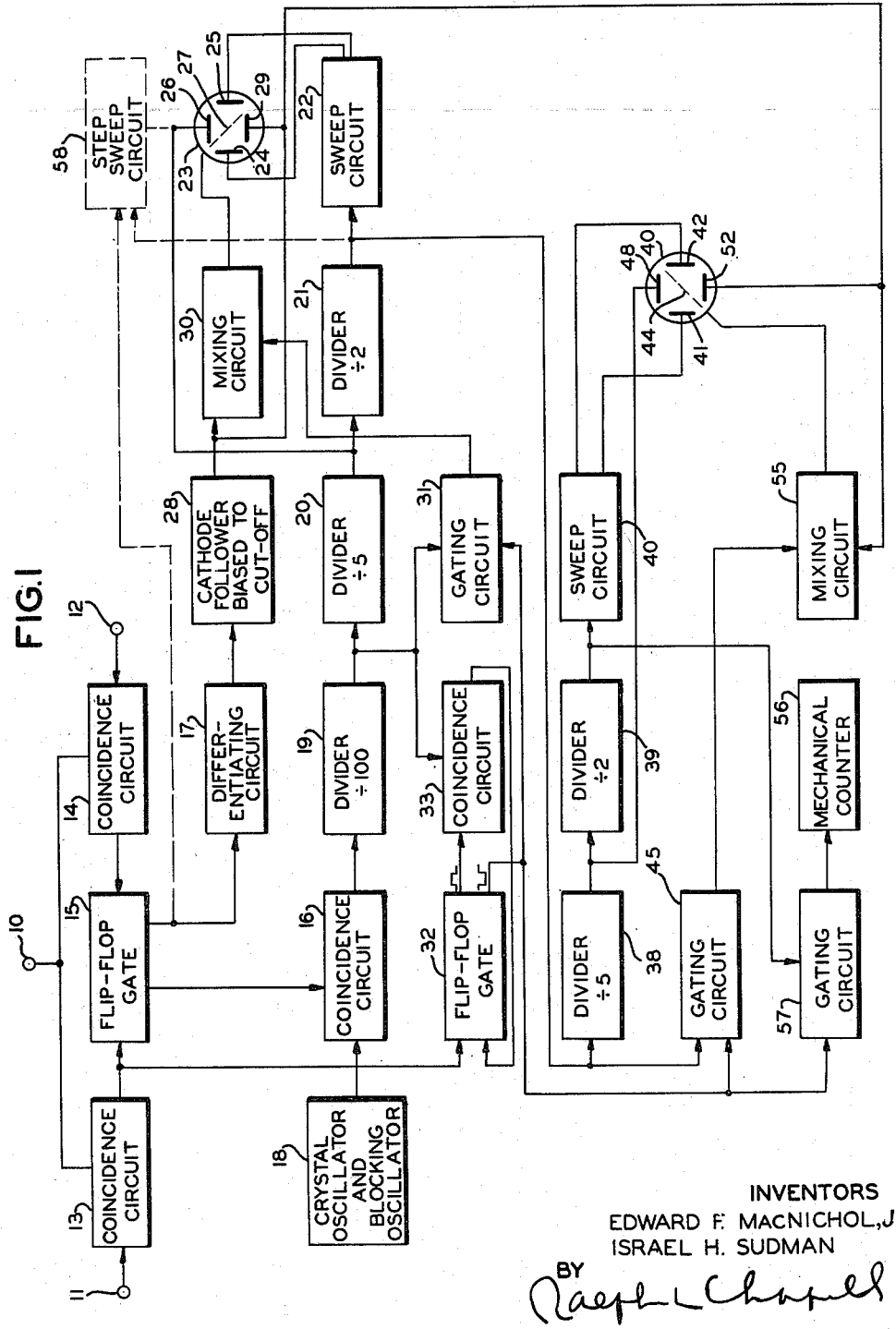

2,626,986

UNITED STATES PATENT OFFICE 2,626,986

SYSTEM FOR DETERMINATION OF VELOCITY

Edward F. MacNichol, Jr., Hamilton, and Israel H. Sudman, Cambridge, Mass., assignors, by mesne assignments, to the United States of America as represented by the Secretary of the Navy Application September 14, 1945, Serial No. 616,409

9 Claims. (Cl. 175—381)

This invention relates to a system for accurately measuring intervals of time, including the extremely short time intervals, which occur in determining the velocity of a rapidly moving body such as a projectile or an airplane, and is particularly useful when used in conjunction with an object detector.

It is well known that object detectors utilizing the principle of detecting the reflected electromagnetic energy from a target are able to detect rapidly moving targets as well as stationary ones. The speed of the target, even when extremely high as in the case of projectiles, is still low relative to the speed of the electromagnetic energy passing to and from the target. The characteristics of a crystal controlled oscillator to produce oscillations of a high and stable frequency are also well known. This invention in the disclosed embodiment utilizes in a unique manner this characteristic of a crystal controlled oscillator to measure the elapsed time required for a target to pass between two positions as established by an electromagnetic object detector.

It is accordingly an object of this invention to provide apparatus for accurately measuring intervals of time.

It is a further object of this invention to provide apparatus for determining the velocity of a rapidly moving target.

It is a further object of this invention to provide apparatus for accurately measuring extremely short intervals of time operative in conjunction with an object detector and utilizing a crystal controlled or any other precision type of oscillator.

Other and further objects will be apparent during the course of the following description together with the accompanying drawings where:

Fig. 1 is a block diagram of an embodiment of the invention;

Fig. 2 is a diagram of certain wave forms arising in the invention, and

Figs. 3, 4, 5 and 6 are views of the indicating means of the invention under operating conditions.

The system in Fig. 1 is intended to operate in conjunction with an object detector of conventional type, and which accordingly is not disclosed. The reflected pulse from the target in video form is applied to terminal 10, while the range marker pips which correspond to the range marks at the first and second ranges are impressed on terminals 11 and 12, respectively. The occurrence of these range marks is determined by timing oscillators synchronized with the time of emission of the transmitter pulse from the object detector. Such oscillators are common in object detectors where accurate range measurement is desired. Consequently, the range marker pips will occur at known times after the emission of the transmitter pulse. In a practical embodiment the first and second range marker pips were set to occur at times corresponding to ranges of 1000 and 3000 yards respectively, to give a range interval for measurement of 2000 yards. When the receiver pulse returns at the same time as the first and second marker pulses are produced the target will have a range of respectively 1000 and 3000 yards with the above mentioned embodiment, and the elapsed time will represent the time required for the target to move from a range of 1000 to 3000 yards. To secure an indication when the receiver pulse occurs at the time of the first and second range marker pulses, coincidence circuits 13 and 14 are provided into which are fed the video and respective range marker pulses. These coincidence circuits may each comprise a pentode tube having both control grid and suppressor grid biased to prevent conduction in the plate to cathode circuit. A positive pulse on either grid alone will not cause the tube to conduct, but when pulses are applied concurrently to both grids the tube conducts to produce an output pulse across a plate resistor. The outputs from the coincidence circuits are each fed to a flip flop gate generator 15 of any convenient form such as an Eccles-Jordan multivibrator. This flip flop gate generator has two outputs, one producing a positive gate and the other a negative gate when triggered to become respectively a negative and positive gate when the circuit is triggered again. One output is fed to coincidence circuit 16, similar to circuits 13 and 14, and the other to differentiating circuit 17. The positive gate is fed to an input of coincidence circuit 16 when the target passes the first range which continues until the target passes the second range, and a negative gate is fed to differentiating circuit 17 during this time interval. To the other input of coincidence circuit 16 is fed a series of pips produced by a blocking oscillator. The blocking oscillator is phase and frequency locked with a crystal controlled or other precision type of oscillator which produces a timing wave of known frequency. The repetition rate of the pips then corresponds to the frequency of the timing wave. Block 18 indicates both the blocking and crystal controlled oscillators. The output of coincidence circuit 16 will consequently be a series of pips during the time of passage of the target between the first and second ranges. The coincidence circuit thus functions to connect and disconnect the timing pips when the target passes the first and second ranges. These timing pips are now fed through three gated dividers 19, 20, and 21 connected in series. These dividers each reduce the repetition rate of the pips by a known and fixed amount. In the embodiment disclosed the repetition rates are reduced to amounts of 1/100, 1/500, and 1/1000 respectively of the initial repetition rate. The output rate of each divider is a unitary fraction of the input rate, that is a fraction having the numerator unitary. Dividers capable of performing this function are well known. The output of the last divider 21 is utilized to trigger a sweep circuit 22 whose sweep voltage is impressed on horizontal deflecting plates 24 and 25 of cathode ray tube 23. The output of dividers 19 and 20 are conveyed respectively to intensifier grid 27 and upper deflecting plate 26 of this cathode ray tube. Differentiating circuit 17 differentiates the leading and trailing edges of the negative gate fed thereto to produce negative and positive pips at times corresponding to passage of the target at the first and second ranges respectively. Block 28 represents a cathode follower biased to cut off. The differentiated positive and negative pulses are fed to this cathode follower, which due to its grid bias only permits passage of positive pulses, which are conveyed to vertical plate 29 of cathode ray tube 23.

To permit the outputs of cathode follower 28 and divider 20 to be impressed on intensifier grid 27 without interaction a mixing circuit 30 is provided. This circuit comprises two triodes having their grids connected to respective inputs and a common cathode resistor connected to intensifier grid 27. For reasons later apparent the first of the series of pips from divider 19 should not be impressed on intensifier grid 27. To block the path from divider 19 to intensifier grid 27 during the occurrence of the first pip a gating circuit 31 is inserted in the path, which operates in conjunction with a flip flop gate generator 32 and a coincidence circuit 33. The output pulse from coincidence circuit 13 is fed to flip flop gate generator 32 to produce a negative and a positive gate. The time duration or length of these gates is determined by coincidence circuit 33. The positive gate from 32 and the pips from divider 19 are fed to coincidence circuit 33. The first output trigger from 33, which corresponds in time to the first pip from 19 is used to flop the gate circuit 32 over to its other stable position. The positive gate from circuit 32 to 33 is terminated by this flop-over. The negative gate applied to 31 is also terminated by this flop-over. Thus this negative gate blocks 31 for only the first pip from divider 19. All succeeding pips after this first one are allowed to pass through 31 to mixing circuit 30.

In operation as best seen from Fig. 2 for each ten pips appearing at the output of divider 19 which are impressed on intensifier grid 27, one sweep will be made by sweep circuit 22, and ten evenly spaced and aligned dots 34 will appear on the screen of cathode ray tube 23 as shown in Fig. 3, which correspond to the output of gating circuit 31 being applied to intensifier grid 27. Over the fifth and tenth dot a vertical line 35 will appear, which corresponds to the output of divider 20 being applied to plate 26. The purpose of these lines is to aid in counting the dots. If the repetition rate of the pips as impressed on divider 19 is 100 kilocycles, the space between each dot will correspond to .001 seconds. The time of passage at the second range appears as a downwardly extending line or index mark on the scope screen such as that indicated by numeral 36 in Fig. 3, which line corresponds to the pip in the output of cathode follower 28 being impressed on plate 29 to indicate the end of the time interval. As noted above gating circuit 31 prevents the first pip of the series from divider 19 being impressed on intensifier grid 27. Otherwise, eleven dots would appear on the screen of scope 23 during the first sweep, the first one of these dots corresponding to "zero units" of time. In order to insure the first dot of each sweep of the appearing in its proper position on the screen, it is necessary that the time of fly back of sweep circuit 22, which flyback is instituted by the pips from divider 21, be substantially less than the time interval between adjacent pips impressed on intensifier grid 27.

An apparatus for counting the sweeps is connected to the output of divider 21. The output of divider 21, whose pips correspond in number to the full sweeps of circuit 22 is applied through two gated dividers 38 and 39 to a sweep circuit 40 whose sweep voltage is impressed on the horizontal plates 41 and 42 of cathode ray tube 40. Gated dividers 38 and 39 form a circuit to reduce in the instant embodiment the repetition rate of their inputs to 1/5 and 1/2 respectively. The intensifier grid 44 of tube 40 is also connected to the output of divider 21 through gating circuit 45. Gating circuit 45 is controlled by the same flip flop gate pulse as controls gating circuit 31, and the first pip of the series from divider 21 will be blanked out. The first pip from divider 21 corresponds to zero full sweeps of sweep circuit 22. Consequently a series of aligned evenly spaced dots will appear on the screen of tube 40 corresponding to the output pips excluding the first of divider 21. Each dot represents one full sweep of circuit 22. These dots as they appear on the screen, are represented by numeral 47 in Fig. 4. Vertical plate 48 is connected to the output of gated divider 38. This produces a vertical line 49 at the fifth and tenth dots to aid in counting the dots. Lower plate 52 is connected with the output of cathode follower 28 to produce a downwardly deflected line or index mark 53 similar to line 36 to indicate on the screen of tube 40 the termination of the interval being timed. A mixing circuit 55 is provided in the path to intensifier grid 44 similar to mixing circuit 30 to isolate the outputs from gating circuit 45 and cathode follower 28. In the representation in Figs. 3 and 4 the measured time would be .0728 second. The "7" is obtained from counting the number of dots on the scope screen in Fig. 4. The "2" is obtained by noting the position of index mark 36 with reference to the dots on the scope screen in Fig. 3, and the "8" is obtained by estimating the position of index mark 36 with reference to the adjacent dots—in this case the second and third.

For measuring intervals of time greater than ten sweeps of sweep circuit 40 a third cathode ray tube and associated circuits may be used to count the number of sweeps of sweep circuit. However, the sweep rate is now sufficiently low to permit the use of a mechanical counter responsive to a trigger pulse and of conventional design. Such a counter is represented by block 56. To eliminate the first or zero count a gating circuit 57 is utilized in a manner similar to gating circuits 31 and 45. Examples of indications of these time intervals are shown in Figs. 5 and 6. The last three digits would be the same as in Figs. 3 and 4, namely 728, but the first would depend on the reading of the mechanical counter. If this reading were, say 5, the time interval would be .5728 second.

In Fig. 2 the projectile is shown as not having yet reached the first range marker. When it arrives there the positive and negative flip flop gates will be produced as shown and also the pips from the various dividers. These will continue until the projectile arrives at the second range marker.

It is thus apparent that a means has been provided which quickly and accurately measures short time intervals. To insure ease of readings, the screens of the cathode ray tubes should have a fairly long persistence, since all the data will be displayed on the screen during the time interval measured. As an alternative, means may be provided to photograph the screens. It is to be noted that since the pips from blocking oscillator 18 have a very high repetition rate, the first pip may be considered as substantially coinciding with the leading edge of the flip flop gate from 15.

An alternative embodiment would be to use the television presentation on cathode ray tube 23 to eliminate cathode ray tube 40 and associated circuits. Instead of having the horizontal sweep on cathode ray tube 23 repeat itself, a step sweep may be applied to one of the vertical plates to produce a vertical spacing between each horizontal sweep. The vertical step sweep arrangement is shown dotted and comprises a step sweep circuit 58 controlled by flip flop gate 15 and the trigger to sweep generator 22. To eliminate any interaction between the outputs of the step sweep circuit and divider 20 a mixing circuit (not shown) may be used.

The invention is to be limited only by the scope of the appended claims.

We claim:

1. A system for measuring the velocity of a moving object over a known predetermined range comprising means for producing voltage pulses related in time to the position of said object and the location of said range, means for producing a series of timing voltage pulses of known constant repetition rate, a frequency divider for producing pulses of a lower repetition rate, switching means for connecting said timing pulses to said frequency divider at time coincidence of said voltage pulses representing position of said moving object with voltage pulses representing the start of said range and for disconnecting said timing pulses from said frequency divider at time coincidence of said voltage pulses representing position of said moving object with voltage pulses representing the end of said range, and means for displaying the reduced frequency pulses produced during the time interval said object traverses said range.

2. A system for measuring the velocity of a moving object over a known predetermined range comprising, means for producing voltage pulses related in time to position of said object, a source of timing voltage pulses of known constant repetition rate, a frequency divider responsive to pulses from said source for producing voltage pulses having a lower repetition rate, means for producing voltage marker pulses related in time to the start and the end of said range, means responsive to time coincidence of said voltage pulses representing position of said moving object with said marker pulses representing the start of said range for connecting said source to said divider and responsive to time coincidence of said voltage pulses representing position of said moving object with said marker pulses representing the end of said range for disconnecting said source from said divider, a multiple cathode ray decade type indicator, means responsive to said reduced repetition rate pulses for producing one sweep of the ray of the first of said indicators to display ten of said reduced rate pulses, and means responsive to said reduced repetition rate pulses for displaying the number of sweeps of said ray of said first indicator on a second of said indicators.

3. Apparatus for measuring the velocity of a moving object over a known predetermined range comprising, means for producing voltage pulses related in time to the position of said object, a crystal controlled oscillator of known frequency, a blocking oscillator controlled from said crystal controlled oscillator for producing a series of timing voltage pulses of known repetition rate, a plurality of frequency dividers fed by said timing pulses to produce a plurality of series of voltage pulses of lower and different repetition frequencies, means for producing voltage marker pulses related in time to the start and end of said range, a switch responsive to time coincidence of said voltage pulses representing position of said moving object with said marker pulses representing the start of said range to connect said timing pulses to said frequency dividers and responsive to time coincidence of said voltage pulses representing position of said moving object with said marker pulses representing the end of said range to disconnect said timing pulses from said frequency dividers, a cathode ray indicator tube, a source of sweep voltages for deflecting the ray of said indicator, means responsive to the voltage pulses of the lowest of said reduced repetition frequency for applying sweep voltages from said source to said indicator, means for applying the pulses of the highest of said reduced repetition frequency to said indicator for display, and means for applying the voltage pulses of intermediate reduced repetition frequency to said indicator as marker pulses at spaced points.

4. Apparatus responsive to radio pulse echo signals for timing the passage of a moving object over a predetermined range comprising, a generator of timing pulses of known constant repetition rate, a source of range marker voltage pulses, a time coincidence detector responsive to said radio pulse echo signals and said marker pulses to produce output pulses in response to the time of arrival of said object at the beginning and at the end of said range, an electronic switch circuit responsive to the output pulses of said detector circuit for starting and stopping said generator, and an indicator for displaying the number of pulses produced by said generator.

5. Apparatus for timing the passage of a moving object over a predetermined range in response to radio pulse echo signals comprising, a source of range marker voltage pulses, a source of timing pulses, a frequency divider responsive to said pulses for producing voltage marker pulses at a reduced repetition rate, a time coincidence detector responsive to said radio pulse echo signals and said marker pulses for producing output pulses in response to the time of arrival of said object at the beginning and at the end of said range, an electronic switch circuit responsive to said output pulses of said detector circuit for connecting and disconnecting said pulse source successively with said frequency divider, and an indicator for displaying said reduced rate marker pulses produced during the time interval said object traverses said range.

6. Apparatus responsive to the radio pulse echo signals for timing the passage of a moving object over a predetermined range comprising, a source of range marker voltage pulses, a crystal controlled oscillator of known frequency, means energized from said oscillator for producing voltage pulses of known repetition rate, means for dividing said pulses of known repetition rate into pulses at a reduced repetition rate, a time coincidence detector responsive to said marker pulses and said radio pulse echo signals for producing a first output pulse in response to the time of arrival of said object at the beginning of said range and a second output pulse in response to the time of arrival of said object at the end of said range, an electronic switch circuit responsive to said first and second detector output pulses for switching said pulse producing means on and off at the beginning and the end of the time interval in which said object traverses said range, a cathode ray indicator, and means for applying said reduced rate pulses to said indicator for display.

7. A system for timing the passage of a moving object over a predetermined range in response to radio pulse echo signals comprising, a source of range marker voltage pulses, a source of timing voltage pulses of known constant repetition rate, a frequency divider responsive to pulses from said source for producing voltage pulses having a lower repetition rate, a time coincidence detector responsive to said radio pulse echo signals and said marker pulses to produce a first output pulse in response to the time of arrival of said object at the beginning of said range and a second output pulse in response to the time of arrival of said object at the end of said range, an electronic switch circuit responsive to said first and second output pulses of said detector circuit for connecting and disconnecting said source from said divider, a multiple cathode ray detector type indicator, means responsive to said reduced repetition rate pulses for producing one sweep of the beam of the first of said indicators to display ten of said reduced rate pulses, and means responsive to said reduced repetition rate pulses for displaying the number of sweeps of said beam of said first indicator on a second of said indicators.

8. Apparatus for measuring the velocity of a moving object over a known predetermined range in response to radio pulse echo signals comprising, a source of range marker voltage pulses, a crystal controlled oscillator of known frequency, a blocking oscillator controlled from said crystal controlled oscillator for producing a series of timing voltage pulses of known repetition rate, a plurality of frequency dividers fed by said timing pulses to produce a plurality of series of voltage pulses of lower and different repetition frequencies, a time coincidence detector responsive to said radio pulse echo signals and said marker pulses for producing a first output pulse in response to the time of arrival of said object at the beginning of said range and a second output pulse in response to the time of arrival of said object at the end of said range, an electronic switch circuit responsive to said first and second output pulses of said detector circuit for connecting and disconnecting said timing pulses to said frequency dividers, a cathode ray indicator tube, a source of sweep voltages for deflecting the ray of said indicator means responsive to the voltage pulses of the lowest of said reduced repetition frequencies for applying voltages from said source to said indicator, means for applying the pulses of the highest of said reduced repetition frequency to said indicator for display, and means for applying voltage pulses of intermediate reduced repetition frequency to said indicator as marker pulses at spaced intervals.

9. Apparatus for measuring the velocity of a moving object by timing its passage over a known predetermined range in response to radio pulse echo signals comprising, a source of range marker voltage pulses, a crystal controlled oscillator of known frequency, a blocking oscillator controlled from said crystal controlled oscillator for producing a series of timing voltage pulses of known repetition rate, a plurality of frequency dividers fed by said timing pulses to produce a plurality of series of voltage pulses of lower and different repetition frequencies, a time coincidence detector responsive to said radio pulse echo signals and said marker pulses for producing a first output pulse in response to the time of arrival of said object at the beginning of said range and a second output pulse in response to the time of arrival of said object at the end of said range, an electronic switch circuit responsive to said first and second output pulses of said detector circuit for connecting and disconnecting said timing pulses from said frequency dividers, a multiple cathode ray decade type indicator, a source of sweep voltages for deflecting the beam of the first of said indicators, means responsive to the voltage pulses of the lowest of said reduced repetition frequencies for applying voltages from said source to said first indicator, means for applying the pulses of the highest of said reduced repetition frequency to said first indicator for display, means for applying voltage pulses of intermediate reduced repetition frequency to said indicator as marker pulses at spaced intervals, and means responsive to said reduced repetition rate pulses for displaying the number of sweeps of said ray of said first indicator on a second of said indicators.

EDWARD F. MacNICHOL, Jr.
ISRAEL H. SUDMAN.

REFERENCES CITED

The following references are of record in the file of this patent:

UNITED STATES PATENTS

| Number | Name | Date |
|---|---|---|
| 2,178,074 | Jakel | Oct. 31, 1939 |
| 2,332,300 | Cook | Oct. 19, 1943 |
| 2,403,600 | Holmes et al. | July 9, 1946 |
| 2,403,626 | Wolff et al. | July 9, 1946 |
| 2,405,238 | Seeley | Aug. 6, 1946 |
| 2,414,479 | Miller | Jan. 21, 1947 |
| 2,422,698 | Miller | Jan. 24, 1947 |
| 2,432,158 | Hulst et al. | Dec. 9, 1947 |
| 2,438,904 | De Rosa | Apr. 6, 1948 |
| 2,452,598 | Page | Nov. 2, 1948 |
| 2,477,615 | Isbister | Aug. 2, 1949 |

FOREIGN PATENTS

| Number | Country | Date |
|---|---|---|
| 552,072 | Great Britain | Mar. 22, 1943 |